Figure 1:
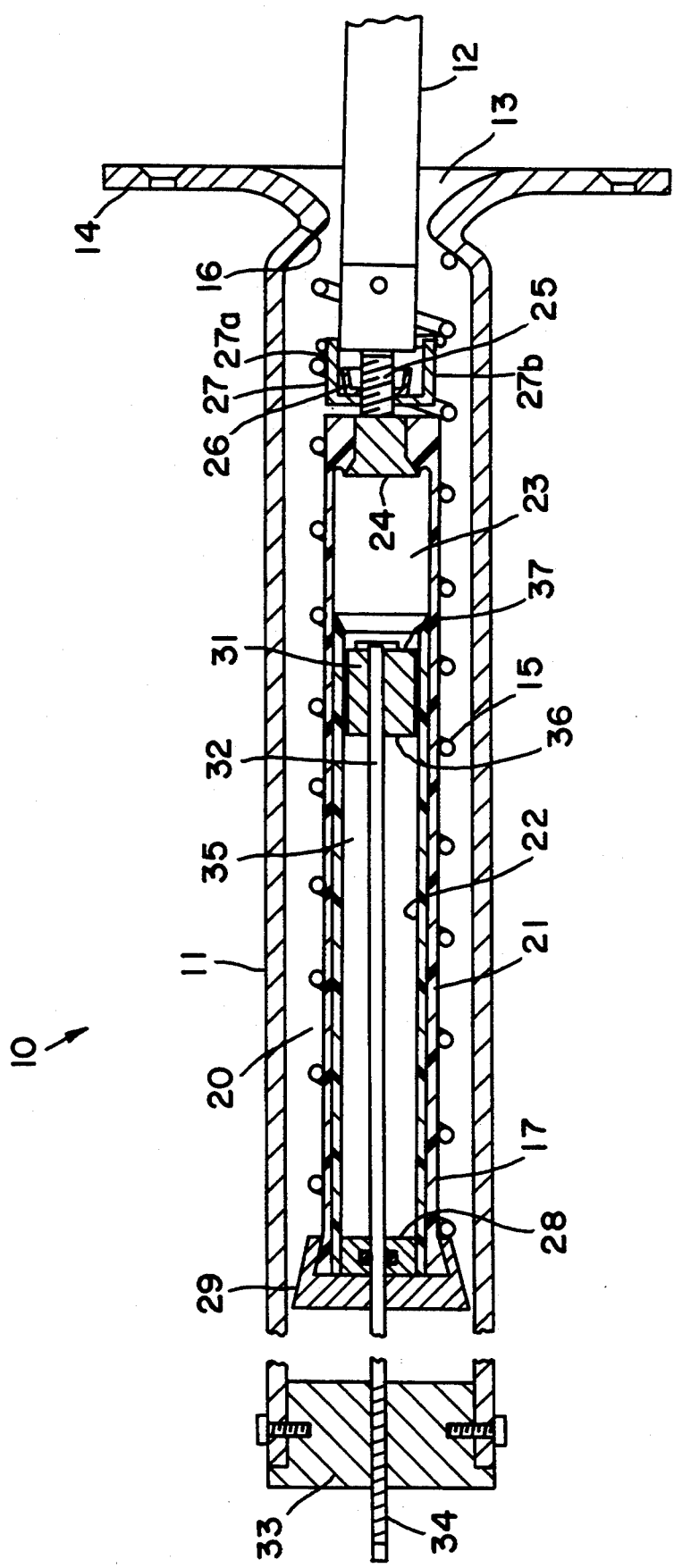

United States Patent
Reid et al.

[11] Patent Number: 5,432,977
[45] Date of Patent: Jul. 18, 1995

[54] DOOR CLOSERS

[75] Inventors: Alister P. Reid, London; John Kopec, Blackburn; Christopher M. Cornwell, Higher Wheelton; Christopher Sumner, St. Helens, all of England

[73] Assignee: Reilor Limited, Lancashire, England

[21] Appl. No.: 184,302

[22] Filed: Jan. 21, 1994

Related U.S. Application Data

[63] Continuation of Ser. No. 45,988, Apr. 9, 1993, abandoned, which is a continuation of Ser. No. 739,864, Aug. 2, 1991, abandoned.

[30] Foreign Application Priority Data

Aug. 9, 1990 [GB] United Kingdom ............... 9017470
Apr. 18, 1991 [GB] United Kingdom ............... 9108332

[51] Int. Cl.$^6$ ................................................. E05F 3/10
[52] U.S. Cl. ............................................ 16/52; 16/61
[58] Field of Search ............... 16/51, 52, 63, 66, 67, 16/61; 188/316

[56] References Cited

U.S. PATENT DOCUMENTS

| | | |
|---|---|---|
| 3,143,757 | 8/1964 | Quinn . |
| 3,343,203 | 9/1967 | Von Wedel .................. 16/67 |
| 3,369,674 | 2/1968 | Carle ......................... 267/120 |
| 3,456,282 | 7/1969 | Eastin . |
| 3,490,607 | 1/1970 | Shafer . |
| 3,531,820 | 10/1970 | Koivusalo ................... 16/52 |
| 3,708,826 | 1/1973 | Larson ....................... 16/52 |
| 4,230,309 | 10/1980 | Schnitzius .................. 16/66 |
| 4,265,344 | 5/1981 | Taylor ....................... 188/322 |
| 4,307,875 | 12/1981 | Schnitzius et al. ........... 16/66 |
| 4,738,339 | 4/1988 | Taylor ........................ 188/322.19 |
| 4,793,451 | 12/1988 | Taylor ........................ 188/316 |
| 5,170,530 | 12/1992 | Kopec et al. ................. 16/52 |

FOREIGN PATENT DOCUMENTS

| | | |
|---|---|---|
| 0332426 | 8/1989 | European Pat. Off. . |
| 41353 | 6/1969 | Finland ....................... 16/52 |
| 3630085 | 8/1988 | Germany . |
| 2104186 | 7/1982 | United Kingdom . |
| 2108576 | 9/1982 | United Kingdom . |
| 2192042 | 6/1987 | United Kingdom . |

Primary Examiner—Lowell A. Larson
Assistant Examiner—Donald M. Gurley
Attorney, Agent, or Firm—Dority & Manning

[57] ABSTRACT

The door closer is of the kind which acts, for example between a door hinge stile and a hinge jamb and has a body for mounting usually in the stile, from which body a spring-biased tension member extends correspondingly for anchoring to an anchoring point (for example in the jamb), wherein a hydraulic cylinder-piston damper is interposed between the tension member and a biasing spring therefor, the damper being adapted to allow fluid in use to flow restrictedly past the piston when the tension member (12) is moved in door-closing and door-opening directions; characterized in that the cylinder of the hydraulic cylinder piston damper is formed of a plastics material, and the cylinder is resiliently expansible in response to an increase in pressure therein such that the clearance between the piston and cylinder is increased to permit increased flow of fluid around the piston.

9 Claims, 1 Drawing Sheet

DOOR CLOSERS

This is a continuation of application Ser. No. 08/045,988, filed Apr. 9, 1993 which is a continuation of Ser. No. 07/739,864, filed on Aug. 2, 1991, now abandoned.

This invention relates to a door closing device for urging an opened door towards its closed position relative to a stationary Jamb.

More particularly, the invention concerns improvements in a door closer which is of the kind that, usually but not always, acts between the hinge stile of the door and the hinge jamb. This kind of closer has an elongate body from which a tension member extends to an anchor element. The body contains a spring which operates to bias the tension member inwardly of the body, for closing the door. The body is normally installed in a bore in the door stile, when the anchor element is installed in the jamb. Conceivably the positions of the body and anchor element might be reversed in the stile and jamb. Also the body and anchor element might be mounted to the faces of the door and jamb or vice versa. Conventionally the tension member has been made flexible and for this an articulated element such as a chain has normally been employed.

Door closers of this kind are effective in operation and beneficial insofar as they provide a concealed installation: they are only partially visible when the door is opened.

A possible drawback of these door closers is that they can close a door too quickly causing it perhaps to bump into someone passing through the opened door or to slam.

An object of the invention is to provide a door closer having a decelerated or damped closing action, and at the same time to keep moving parts to a minimum in the interests of simplicity and cost effectiveness.

Door closers, of the general type to Which this invention relates, are known wherein hydraulic cylinder/piston dampers are incorporated. These closers, which are marketed by Perkins & Powell PLC, England and Worcester Parsons, England feature unidirectional valve means in their hydraulic dampers. The valve means are intended to allow easy opening by overriding the damping when the door is opened, and to restore damping as soon as the door is released for closing. Such valve means complicate the manufacture of door closers and add significantly to their cost.

The applicants have previously disclosed (see EP-A-0 332 426) that such valve means can be eliminated without making the opening of a door unduly burdensome, and that most of the effort required to open the door is directed at stressing the closing spring; in practice, only a little extra effort need be expended in overcoming the hydraulic resistance of the damper. Thus, in EP-A-0 332 426, it was disclosed that the hydraulic resistance on opening is minimised by appropriately undersizing the piston relative to its cylinder, in combination with appropriately selecting the viscosity of the hydraulic fluid of the damper.

The present invention relates to further improvements in door closers of the general type discussed hereinabove.

It has now been found that a significant, and unexpected, advantage arises from the use of a plastics material in the manufacture of a damper. Thus, it has been found that during movement of the piston along the cylinder bore in use, the cylinder is capable of expanding in response to increases in pressure therein, thereby increasing the clearance between cylinder wall and piston to permit increased flow of hydraulic fluid therebetween. By appropriate choice of type of plastics material and the thickness of the cylinder wall, it is possible to adjust the expansibility of the cylinder such that there is substantially no expansion at normal opening and closing speeds but expansion does take place when the door is opened or closed rapidly. This is advantageous because sudden large increases in internal pressure, which could cause damage to the damper can be accommodated by virtue of the increased clearance between cylinder and piston.

In a first aspect, therefore, the invention provides a door closer of the kind which acts, for example, between a door hinge stile and a hinge Jamb and has a body for mounting usually in the stile, from which body a spring-biased tension member extends correspondingly for anchoring to an anchoring point (for example in said hinge jamb), wherein a hydraulic cylinder-piston damper is interposed between said tension member and a biasing spring therefor; said damper being adapted to allow fluid in use to flow restrictedly past said piston when said tension member is moved in door-closing and door-opening directions; characterised in that the cylinder of the hydraulic cylinder damper is formed of a plastics material, and the cylinder is resiliently expansible in response to an increase in pressure therein such that the clearance between the piston and cylinder is increased to permit increased flow of fluid around the piston.

It is preferred that the thickness of the cylinder wall and the plastics material from which the cylinder is constructed are chosen such that when the door is allowed to close without being pushed, ie. when the force of the biasing spring is the sole door-closing force, there is little or no discernible expansion of the cylinder and hence the cylinder/piston arrangement can exert its full damping effect. If the cylinder wall is too readily deformable, the result will be that the cylinder/piston arrangement will provide insufficient damping. Conversely, if the cylinder is insufficiently deformable, the advantage of improved ability to cope with very rapid door opening and closing will not be realised and the user will feel an unacceptable resistance when opening the door quickly.

The plastics material may be of a type which is suitable for engineering applications, ie. it may be a grade of plastics material known as engineering plastics. Examples of suitable engineering plastics are polyacetal and certain special grades of nylon. Suitable plastics materials may have, for example, a tensile strength of the order of $10^4$ lbf/in$^2$ (69 MPA) or greater, although lower strengths may in some cases be tolerable. By tensile strength is meant the tensile strength on yield.

The plastics material also, preferably, has a low coefficient of friction. A low coefficient of friction may arise from the inherent properties of the polymer or may be due to an additive which gives rise to good surface lubrication.

The modulus of elasticity of the plastics material can be around $450 \times 10^3$ lbf/in$^2$ (3100 MPA) at 23° C., or greater.

The thickness of the wall of the cylinder will depend upon the nature of the plastics material used and the degree of expansibility required. However, for a cylinder with a main bore of 8mm and a stroke of the order of 60 mm, suitably the total thickness of the cylinder wall surrounding the main bore is of the order of 3.5 mm.

Preferably, according to the invention, the damper features a fluid by-pass operative as the closer approaches a door-closed condition. By means of the by-pass, the damping effect is removed as the door enters its final closing movement, so its spring-driven swinging motion is accelerated. This is to enable the door to overcome latch resistance so as to be closed properly.

The fluid by-pass may be, for example, simply an enlargement of the bore. Thus, where as indicated above the main bore is of the order of 8 mm, the enlarged bore could be of the order of 2 mm greater in diameter.

A general requirement of our piston and cylinder damper construction is that the piston and cylinder must each be manufactured to very close tolerances. The consequence of only relatively small deviations from a specified cylinder bore or piston diameter can be greatly differing door closing speeds. Known dampers have been constructed from metal and thus almost inevitably the piston and cylinder are manufactured in different operations. The separate manufacture of piston and cylinder can give rise to the possibility of random errors occurring during the manufacturing process; for example through incorrect machine settings and changes in atmospheric conditions (eg. temperature) between the manufacture of the pistons and manufacture of the cylinder. To avoid such errors other manufacturers' metal pistons and cylinders have incorporated "O" ring or similar seals between the pistons and cylinders and rather complex unidirectional valves in the piston.

In a further aspect of the invention, it has now been found that dampers of the piston and cylinder type can be manufactured significantly more cheaply and accurately by forming both the cylinder and the piston from a suitable plastics material. A substantial advantage of using plastics materials, by comparison with the metals used in known piston/cylinder dampers is that both piston and cylinder can be formed using the same moulding tool. This means that the piston and cylinder are both exposed to the same atmospheric conditions during manufacture and, if errors in machine settings are made, piston and cylinder are affected to the same extent. Therefore, even if piston diameter and cylinder bore do depart from the intended dimensions, the desired clearance between the piston and the cylinder wall will nevertheless be maintained.

The invention will now be described in more detail by way of example only with reference to and as shown in the accompanying drawing in which:

FIG. 1 is a longitudinal cross-section through a concealed door closer according to the invention.

The concealed door closer according to the invention comprises (a) a main body 11, (b) an anchor member (not shown) and a spring-biased tension member 12 extending from the main body 11 and coupled to the anchor member. The main body 11 is for mounting in a bore usually provided in a door stile, a mounting plate 14 at one end of the body being recessed into the stile and screwed thereto as normal. The tension member 12, is in the form of an arcuate steel strip having hinge means at each end. Tension member 12 protrudes from an aperture 13 in the aforesaid end of the body 11. It is coupled pivotally to an anchor element which may also have a mounting plate similar or identical to plate 14.

The anchor element is recessed in and secured to the door Jamb opposite to the body 11 in the door. The anchor element is not illustrated and will not be described further since exemplary elements are known.

As indicated hereinbefore, the relative positions of the body 11 and the anchor element could be reversed in a suitable installation, the body then being mounted in the door frame or jamb and the anchor element being mounted in the door stile.

Inside the body 11 there is a main spring 15 which acts at one end against an inwardly protruding surface of a neck region 16 in the body 11. The other end of the spring 15 bears against a movable inner cylinder element 17; the latter having the tension member 12 pivotally fastened thereto. The spring 15 is in a state of compression and is thus effective in biasing the tension member inwardly of the body 11. As viewed in FIG. 1, therefore, the spring 15 thrusts the inner cylinder element 17 axially towards the left, or inner, end of the body 11. In use, when a door containing the closer is opened, the door stile swings away from the anchor element set in the door jamb. The tension member 12 is thus pulled outwardly of the main body 11, dragging the inner cylinder element 17 to the right and thereby increasing the compression in the main spring 15. When the opened door is released, the main spring 15 relaxes thrusting cylinder element 17 rearwardly to the left and causes the tension member 12 to be retracted inwardly of the housing. This, of course, has the effect of closing the door.

Apart from the inner cylinder element 17, the structure described so far is substantially the same in its principles of construction and operation as the concealed door closer disclosed in EP-A-0 332 426. The inner cylinder element 17 is part of a hydraulic damper unit 20.

The cylinder element 17 comprises a cylindrical barrel portion 21 formed of an engineering grade plastics material such as polyacetal, for example Delrin 100 available from Dupont. In this example, the bore of the barrel portion 21 is lined for approximately 4/5 of its length by an inner sleeve portion 22 also formed of polyacetal. The unlined region of the bore defines an enlarged bore portion or fluid by-pass 23.

The cylinder element is closed at one end by a wall member 24, formed of metal which includes an outwardly-extending threaded lug 25. Secured to the lug by means of a nut 26 is a bracket 27 having arms 27a and 27b which retain a hinge pin. The hinge pin provides a pivotal attachment for the tension member 12.

The cylinder element is closed at its opposite end by a plug forming a centrally apertured second fixed wall 28, which is formed of an engineering grade plastics material such as polyacetal homopolymer. This closed end of the cylinder element is strengthened by a centrally apertured steel cap 29 which fits over and is secured to the end of barrel portion 21.

The damper unit also includes a piston 31 with a piston rod 32. The piston 31, which in this embodiment is formed of metal or a similar engineering grade plastics material (polyacetal homopolymer) as the cylinder 17, is on the inner extremity of the rod 32, which extends rearwardly of the piston through the aperture of wall 28.

A fixed seal is provided at the aperture of wall 28. The fixed seal can, for example, be an O-ring or equivalent seal capable of establishing a seal between the wall 28 and the piston rod 31 to-prevent fluid loss there-through. A suitable seal is a flat rubber disc sandwiched between anti-extrusion discs eg. of PTFE.

The rod 32 extends out of the main body 11 through an apertured end plug 33 thereof. The end plug 33 and end portion 34 of the piston rod are matchingly screw-threaded. The screw-threaded interengagement of the end plug 33 and piston rod 32 fixes the rod and piston 31 against axial movement in the damper unit in normal use. The screw-threaded interengagement allows the position of the piston to be adjusted, as may prove necessary, to ensure the door closer is operative to overcome latch resistance when closing the door. To assist in adjusting the damper unit in this way, the outer end of the piston rod 32 is slotted for a screw driver.

The space inside the damper unit which is bounded by the end wall 24, the end wall 28 and the cylinder shell is filled with hydraulic fluid. Preferably this is a silicone fluid. Conveniently, it is Dow Corning (RTM) 200 fluid. This fluid is available in a range of viscosity grades which can be blended in varying proportions, as explained in the manufacturer's technical literature, to obtain any chosen viscosity.

The piston 31 is deliberately undersized with respect to the main bore 35 of the cylinder. The undersizing is to permit hydraulic fluid to flow from one side of the piston to the other when the cylinder and piston move relatively in response to door opening and closing movements. Since the main body 11 is secured in the door, and the piston is in use immobile thanks to the screw-threaded connection of its rod 32 to the body end plug 33, opening and closing movements of the door cause the cylinder element 17 to move to and fro relative to the piston 31. The opening movement causes the cylinder element 17 to move outwardly, or forwardly to the right, while the spring-biased closing movement is accompanied by an opposite, rearward movement of the cylinder element.

In use, therefore, during an opening movement the seal end of the cylinder element 17 moves towards rear face 36 of the piston 31. Hydraulic fluid then flows past the piston 31 to occupy the space created between its forward face 37 and the fixed wall 24. The fluid flows in the clearance space around the piston which clearance space results from the undersizing thereof. During a closing movement, the fluid flows in the opposite direction. Ultimately, the piston enters the enlarged bore portion of the cylinder element, ie. the by-pass 23 and the closer then is in the door-closed condition.

Obviously, movement of the cylinder element 17 is opposed by hydraulic resistance. Tests have shown that the resistance is not significantly different in the door-opening and door-closing directions of operation, when the closer is activated by an identical force in each direction.

With suitably matched fluid viscosity and clearance space, hydraulic hindrance to opening can be insignificant in comparison with the effort needed to compress the spring 15, while adequate damping on closing is attained.

However, very rapid opening of the door can lead to a dramatic and sudden increase in pressure in front of the leading face of the piston of a magnitude which could impose a severe strain on the door closer, leading to destruction in certain circumstances. However, by making the cylinder expansible, the sudden increase in pressure leads to the cylinder wall 21, 22 being forced outwardly thereby increasing the clearance between piston 31 and wall 22.

This enables increased flow of hydraulic fluid past piston 31 thereby reducing the pressure in front of the leading face of the piston. Thus the resilient wall 21, 22 and piston 31 together act as valve means to prevent excessive pressure buildup when the door is opened very quickly. Moreover, unlike conventional door closers having only a one-way valve means set into the piston itself, excessive pressure buildup can also be prevented if it is desired to override the damping mechanism and close the door quickly.

Merely by way of example, some dimensional figures will be given for one particular embodiment of the invention. The main bore 35 of cylinder element 17 is 8 mm and the total length of the bore is approximately 55 mm. The piston 31 is 9 mm long and has a diameter of 7.87 mm and thus is 0.13 mm undersized with respect to the cylinder bore 35. If the piston and cylinder are accurately coaxial (which is not essential) the clearance for fluid flow is 0.1 mm wide or 3.7 mm$^2$ in area. With such a clearance, we have found that a suitable hydraulic fluid is one having a viscosity of the order 12500 cSt ($12.5 \times 10^{-3}$ m$^2$/s). The area of face 36 is 41.6 mm$^2$ and of face 37 is 48.6 mm$^2$, the piston rod having a diameter of 3 mm. Overall, the main body 11 has an outer diameter of about 24 mm and a length of some 17.5 cm.

The thickness of the wall defining the main bore 35 is approximately 0.137" (3.48 mm). At an internal pressure of approximately 1400 PSI (96.5 bar), a piston/cylinder arrangement with the aforementioned dimensions would experience an increase in diameter of the main bore of the order of 0.051 mm (0.002").

The invention, of course, is not to be limited to the foregoing dimensions and viscosity, which can be varied recognising that as the clearance is increased, a greater viscosity can be tolerated. Matching the clearance and viscosity is a matter of experiment, the aim being to achieve a damped closing movement which is adequately smooth and rapid.

The damper unit 20 includes a fluid by-pass operative as the closer approaches a door-closed condition. The by-pass 23 is an enlarged, end portion of the cylinder element 17. The by-pass 23 is located at the end of the cylinder element wherein the piston 31 reposes in the door-closed position. The by-pass may have an internal diameter some 2 mm larger than the piston.

The function of the by-pass 23 is to significantly reduce or effectively remove the hydraulic damping during the final closing stage, by providing an enlarged clearance for fluid to pass around the piston. The effect of the by-pass 23 is to allow the closer spring 15 to accelerate the door as it swings through the last part of its closing movement, to ensure the swinging movement is fast enough that the door can become latched. In other words, the door is accelerated so as to be able to overcome the normal door latch resistance. As a guide, the by-pass may become effective when the door enters the last 20° of its closing swing.

Of course, different door latches offer different latch resistances, and in some instances there may be no latch fitted to the door. To enable the closer 10 to close a door adequately, but not excessively hard, the closer 10 is adjustable to vary the point in the door's closing swing at which the by-pass 23 becomes operative. The adjustment is effected by advancing or retracting the piston 31 and rod 32 axially of the cylinder element 17. The screw-threaded interengagement between the outer end 34 of the piston rod 32 and the body end plug 33 provides for the desired adjustment.

As described and shown, the damper unit 20 has the piston 31 fixed and the cylinder element 17 movable, the tension member 12 being secured to the latter.

A door closer embodying the invention can, in principle, be designed to have a fixed cylinder element and a movable, spring biased piston and rod to which the tension member is secured.

In the embodiment illustrated in FIG. 1 and described above, the damper is adapted to allow fluid to flow past the piston by virtue of the undersizing of the piston relative to the bore of the companion cylinder. However, in an alternative embodiment, the piston may be pierced by one or more small diameter passages which permit fluid to pass through the piston in either direction. Alternatively (or additionally), the piston and/or the inner wall of the cylinder may have one or more grooves or slots running along their respective lengths through which fluid may pass in either direction.

It is envisaged that in the aforesaid alternative embodiments, a seal ( eg. an O-ring ) would be provided between the outer surface of the piston and the cylinder wall such that, under normal operating pressures, fluid would be constrained to flow through the passages, grooves or slots in the piston and/or cylinder wall. However, under a predetermined higher pressure, the plastics cylinder would expand to break the seal between piston and cylinder wall to allow increased flow of fluid past the piston.

It will be appreciated that the dampers of the present invention could conceivably be provided with unidirectional valve means such as are known in the art. However, a significant advantage of this invention is that such unidirectional valves are not necessary, and thus the complexity and cost of manufacturing the dampers can be significantly reduced.

It will be appreciated that the hydraulic fluid employed in the damped door closer illustrated in FIG. 1 and described above is significantly more viscous than the fluid that would be used in a door closer whose damper incorporates small-dimensioned, passages, grooves or slots. For damped door closers provided with such passages, grooves or slots, relatively limpid hydraulic fluids may be used.

In contrast, the silicone fluids preferred for the embodiment illustrated in FIG. 1, wherein an undersized piston arrangement is used, are highly viscous. By way of example, the silicone fluids may be blended to have viscosities of 2500 cSt or more, for example approximately 5000 cSt or more, e.g. in the range 5000–12,500 cSt, such as 7000–75000 cSt, and these preferred fluids are relatively insensitive to changes in temperature. This temperature-insensitivity is highly beneficial. In-service changes in ambient temperature from day to night, or from season to season, will not seriously affect the damping characteristics, even where the temperature range may be large. Moreover, from a manufacturing standpoint these fluids are beneficial since a given fluid may suit various markets of widely differing climates.

We claim:

1. A door closer for acting between a door hinge stile and a hinge jamb comprising a body for mounting in one of said stile or said jamb, a cylinder carried within said body, a spring-biased tension member fastened to said cylinder and extending from said body for coupling to an anchoring point on the other of said stile or said jamb, a spring carried within said body and interposed between said body and said cylinder, said cylinder comprising a plastics cylindrical barrel portion and a plastics inner sleeve portion carried within said cylindrical barrel portion wherein said plastics inner sleeve portion has a length less than the length of said plastics cylindrical barrel portion to provide an enlarged region within said cylinder, a piston rod carried within said cylinder, a piston mounted on said piston rod and positioned within said cylinder so that one of said cylinder or said piston may move axially relative to the other of said cylinder or said piston during door closing and door opening operations, and said piston being sized relative to said plastics inner sleeve portion and said plastics cylindrical barrel portion so as to allow fluid contained within said cylinder to by-pass said piston more easily when said piston is moving within said enlarged region than when said piston is moving within said plastics inner sleeve portion.

2. A door closer according to claim 1, wherein said door closer is valve-less.

3. A door closer according to claim 1, wherein said plastics is a polyacetal homopolymer.

4. A door closer according to claim 1, wherein said tension member is an arcuate metal spring strip pivotally connected to said cylinder.

5. A door closer according to claim 1, wherein said piston is formed of a plastics material.

6. A door closer according to claim 1, wherein said plastics material is a polyacetal homopolymer.

7. A door closer according to claim 1, wherein said piston, said plastics inner sleeve portion, and said plastics cylindrical barrel portion are formed of a polyacetal homopolymer.

8. A door closer for acting between a door hinge stile and a hinge jamb comprising a body for mounting in one of said stile or said jamb, a cylinder carried within said body, a spring-biased tension metal spring strip pivotally connected to said cylinder and extending from said body for coupling to an anchoring point on the other of said stile or said jam, a spring carried within said body and interposed between said body and said cylinder, said cylinder comprising a plastics cylindrical barrel portion and a plastics inner sleeve portion carried within said cylindrical barrel portion wherein said plastics inner sleeve portion has a length less than the length of said plastics cylindrical barrel portion to provide an enlarged region within said cylinder, a piston rod carried within said cylinder, a piston mounted on said piston rod and positioned within said cylinder so that one of said cylinder or said piston may move axially relative to the other of said cylinder or said piston during door closing and door opening operations, and said piston being sized relative to said plastics inner sleeve portion and said plastics cylindrical barrel portion so as to allow fluid contained within said cylinder to by-pass said piston more easily when said piston is moving within said enlarged region than when said piston is moving within said plastics inner sleeve portion.

9. A door closer according to claim 8, wherein said door closer is valve-less.

* * * * *

UNITED STATES PATENT AND TRADEMARK OFFICE
CERTIFICATE OF CORRECTION

PATENT NO. : 5,432,977

DATED : July 18, 1995

INVENTOR(S) : Reid et al

It is certified that error appears in the above-identified patent and that said Letters Patent is hereby corrected as shown below:

Column 1, line 39, please change the capital "W" in "Which" to a lower case "w".
Column 2, line 17, please delete ".Jamb" and insert therefor --jamb--.
Column 2, line 45, please delete "realised" and insert therefor --realized--.
Column 4, line 2, please change the capital "J" in "Jamb" to a lower case "j".
Column 4, line 68, please delete the hyphen in "to-prevent".
Column 6, line 17, please delete "35" and insert therefor --38--.
Column 8, line 31, please make claim 6 dependent on claim 5 instead of claim 1.

Signed and Sealed this

Twenty-first Day of November, 1995

Attest:

BRUCE LEHMAN

Attesting Officer

Commissioner of Patents and Trademarks